United States Patent [19]

Tomimatsu

[11] Patent Number: 5,564,329
[45] Date of Patent: Oct. 15, 1996

[54] APPARATUS FOR SUPPLYING SPECIFIED QUANTITY OF COOKING MATERIAL

[75] Inventor: Kazunari Tomimatsu, Mie, Japan

[73] Assignee: Fuji Electric Co., Ltd., Kawasaki, Japan

[21] Appl. No.: 587,703

[22] Filed: Jan. 19, 1996

[30] Foreign Application Priority Data

Jan. 26, 1995 [JP] Japan ................................. 7-029966
Oct. 2, 1995 [JP] Japan ................................. 7-278376

[51] Int. Cl.$^6$ ............................ A23P 1/00; B65G 33/00
[52] U.S. Cl. ............................... 99/334; 99/352; 99/355; 99/443 C; 99/489; 222/56; 222/238; 366/132; 366/133; 366/151.1; 366/155.1; 366/156.1
[58] Field of Search ................. 99/485–489, 352–353, 99/325–331, 373, 374, 443 C, 334–336; 366/132, 133, 150.1, 151.1, 131–135, 155.1, 154.1, 156.1, 156.2, 158.3; 222/238, 252, 56, 63, 414, 135

[56] References Cited

U.S. PATENT DOCUMENTS

| | | | |
|---|---|---|---|
| 2,201,552 | 5/1940 | Ahlmann | 366/156.1 |
| 2,243,896 | 6/1941 | Cupples | 222/252 X |
| 3,748,073 | 7/1973 | Lankford et al. | 99/489 X |
| 3,870,199 | 3/1975 | Dugger et al. | 222/238 X |
| 3,882,768 | 5/1975 | Troisi et al. | 99/352 |
| 4,083,475 | 4/1978 | Venner et al. | 222/238 |
| 4,611,921 | 9/1986 | Patel | 366/156.1 |
| 4,859,072 | 8/1989 | Fey et al. | 366/156.1 |
| 5,184,754 | 2/1993 | Hansen | 222/56 X |
| 5,261,743 | 11/1993 | Moller | 222/63 X |
| 5,332,308 | 7/1994 | Scheuring | 366/155.1 |
| 5,333,762 | 8/1994 | Andrews | 222/238 |
| 5,381,837 | 1/1995 | Kurosu et al. | 222/238 X |

*Primary Examiner*—Timothy F. Simone
*Attorney, Agent, or Firm*—Kanesaka & Takeuchi

[57] ABSTRACT

A specified-quantity supply apparatus of the invention transfers a specified amount of a cooking material. The apparatus is formed of a material stocker for retaining the cooking material therein, a pair of blade rollers disposed in the material stocker to be parallel to each other, and a screw disposed below the blade rollers and rotating around a shaft extending parallel to shafts of the blade rollers to transfer the cooking material falling from the blade rollers toward a discharge port. A material detection sensor may be disposed above the screw to detect the cooking material on the screw, and a rotational speed of the blade rollers may be controlled based on a detection result of the material detection sensor. A control device may control rotation of the blade rollers for a specified period of time after number of rotation of the screw reaches a set value. Thus, a required amount of the cooking material is constantly supplied on the screw.

11 Claims, 5 Drawing Sheets

APPARATUS FOR SUPPLYING SPECIFIED QUANTITY OF COOKING MATERIAL

BACKGROUND OF THE INVENTION AND RELATED ART STATEMENT

The present invention relates to a specified-quantity supply apparatus for supplying from a material stocker a specified amount of a cooking material, such as sliced cheese and vegetables, which is liable to be cut or crushed and stick to the apparatus.

In conventionally known specified-quantity supply apparatuses for such cooking materials, a vibrating plate is used to vibrate a material falling from a material stocker for separating masses from the material and transferring the same.

FIGS. 12(A) and 12(B) illustrate this technique schematically. In these figures, reference numeral 51 designates a material stocker disposed on a main body base 52; 53 is a motor; 54 is a pair of rollers disposed in parallel and rotationally driven by the motor 53; 55 is a vibrator; 56 is a vibrating plate driven by the vibrator 55 and vibrating in the direction of the arrow.

In other conventional techniques, a spiral screw is used to transfer a material falling from a material stocker.

FIG. 13 illustrates this technique schematically. In this figure, reference numeral 57 denotes a material stocker; 58 is a screw case; 59 is a pair of blade rollers; 60 is a roller drive motor; 61 is a screw; 62 is a screw drive motor; and 63 is a cooking material discharge port.

The conventional technique as shown in FIGS. 12(A) and 12(B) has the following problems.

1. The material stocker 51 may be clogged with a falling material. This is called "bridging".

2. When the material falls from the material stocker 51 onto the vibrating plate 56, the material may be damaged, that is, it may be cut or crushed.

3. A specified amount of the material can not be transferred or supplied easily.

Furthermore, the conventional technique as illustrated in FIG. 13 has the following drawbacks.

1. The screw case 58 may be clogged with particularly a moist material, such as sliced vegetable.

2. The material may be crushed near the discharge port 63 or block the discharge port 63.

3. A specified amount of a material can not be transferred or supplied easily.

The invention proposes to solve these problems, by providing a specified-quantity supply apparatus for a cooking material, which prevents the material from blocking the discharge port and which prevents damage to the material near the discharge port, to thereby transfer the specified amount of and material properly.

SUMMARY OF THE INVENTION

To achieve the above object, the invention in a first aspect provides a specified-quantity supply apparatus for transferring a specified amount of a cooking material from a material stocker to the outside, which comprises a pair of blade rollers disposed in parallel in the material stocker to extrude the material by using the blades rotating in opposite directions to drop the material; a screw disposed below these blade rollers, which rotates around a shaft extending parallel to center shafts of the blade rollers to transfer the material falling from the blade rollers toward a discharge port; a material detection sensor for detecting the material on the screw; and means for controlling the rotational speed of the pair of the blade rollers based on the detection result of the material detection sensor.

Thus, the material detection sensor is used to check whether or not the material on the screw is being transferred smoothly while controlling the rotational speed of the blade rollers to thereby prevent the amount of the material on the screw from being too much or small and to supply the specified amount of the material.

The pair of blade rollers are preferably rotated outwardly to drop the material along the surface of walls of the material stocker, and the blades of the blade rollers are preferably made of a soft material, such as soft rubber, etc. As a result, the material can be uniformly dropped onto the screw without damaging to the material.

If a material guide plate is provided to axially guide the material falling from the blade rollers from the center portion to the rear end of the screw, the material can be prevented from being stranded at the front of the screw axis.

In a second aspect of the invention, the invention provides a specified-quantity supply apparatus for transferring a specified amount of a cooking material from a material stocker to the outside, which comprises a pair of blade rollers disposed in parallel in the material stocker to extrude the material by using blades rotating in opposite directions to drop the material; a screw disposed below these blade rollers and rotating around a shaft extending parallel to the center shafts of the blade rollers to transfer the material falling from the blade rollers toward a discharge port; and control means for rotating the blade rollers for a specified period of time when the rotational number of the screw reaches a set value.

In this structure, the cooking material corresponding to the number of rotation of the screw can be supplied from the blade rollers toward the screw to thereby prevent the material from being clogged or crushed above the screw and to allow the material to be supplied smoothly.

If the front surface and sides of the screw case are shaped such that it is laterally symmetric and protruding portions are formed on the inner surface of the screw case, the cooking material within the screw case can be prevented from deviating and sticking to the inner surface of the screw case.

A cylindrical portion surrounding the screw case may be formed such that it is eccentric with respect to the screw at the discharge port thereof, or it is concentric with respect to the screw and has a somewhat larger diameter than the screw at the discharge port thereof, or it has tapered sides in such a way that the space between the cylindrical portion and the screw becomes larger toward the inside of the discharge port. As a result, it is possible to form a space to allow the cooking material to enter, at which a compressive force is applied by the screw, to further effectively prevent the material from being clogged and crushed.

By disposing between the blade rollers and the screw a wheel that rotates in synchronization with the screw, mounting an agitating member to agitate the cooking material, and forming the agitating member like a stick so that it rotates along the inner surface of the screw case, it is possible to further prevent the cooking material from stacking to each other above the screw or from sticking to the inner surface of the screw case, to thereby allow the cooking material to be fed to the screw stably.

DETAILED DESCRIPTION OF PREFERRED EMBODIMENTS

Embodiments of the invention are explained with reference to the drawings.

Figure 1:
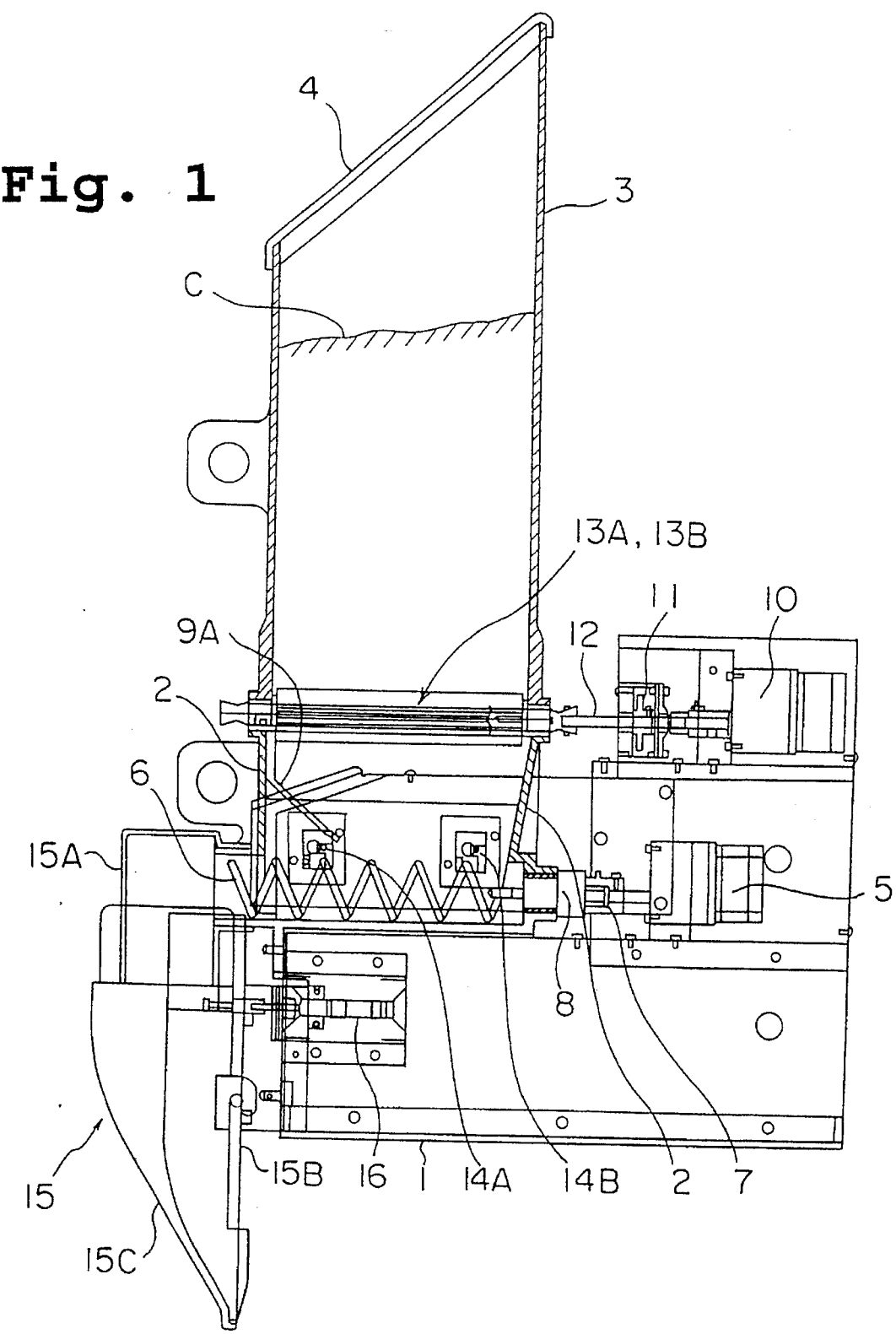
FIG. 1 is a side view for showing a first embodiment of the invention.
Figure 2:
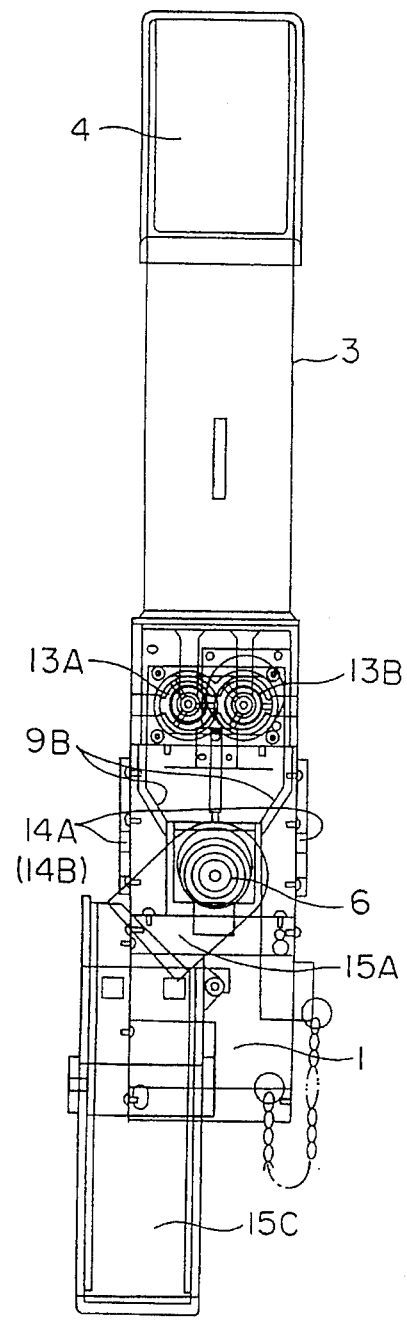
FIG. 2 is a front view of the embodiment of FIG. 1.

FIG. 1 is a side view for showing a first embodiment of the invention, and FIG. 2 is a front view thereof. In these figures, numeral 1 is a main body, and a material stocker 3 is disposed thereon through a base 2. Reference numeral 4 denotes a cover for the material stocker 3, and C is a cooking material, such as powdered cheese.

A screw drive motor 5 is fixed at an upper rear end of the main body 1, by which a screw 6 inside the base 2 is rotated. An output shaft of the motor 5 is connected to the screw through a joint 7 and a boss 8.

As shown in FIG. 1, a material guide plate 9A is mounted above the screw 6. The material guide plate 9A prevents the material C that is transferred toward a discharge port by the rotation of the screw 6 from being stranded in front of the screw 6 or near the surface of the wall by axially guiding the falling material C from a center area to the rear end of the screw.

In FIG. 2, numeral 9B also shows material guide plates, and this pair of the material guide plates 9B are skewed so that they effectively guide to the area above the center of the screw 6 the material C falling along the surfaces of both walls of the material stocker 3 due to the external rotation of blade rollers 13A, 13B described below.

A roller drive motor 10 is fixed above the motor 5. The output shaft of the motor 10 is connected via a gear 11 and a joint 12 to the respective center shafts of a pair of the blade rollers 13A, 13B disposed in parallel. These center shafts extend parallel to the rotational center shaft of the screw 6.

Figure 3:
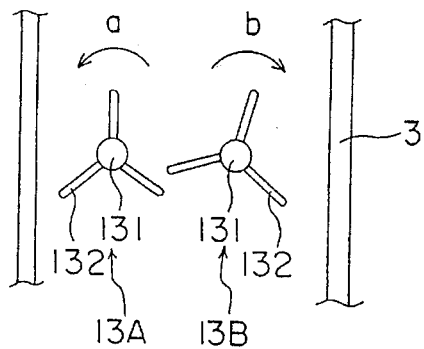
FIG. 3 is a front view of blade rollers in the embodiment of FIG. 1.

FIG. 3 is a front view of the blade rollers 13A, 13B, each of which comprises a center shaft 131 and three blades 132.

Figure 4:
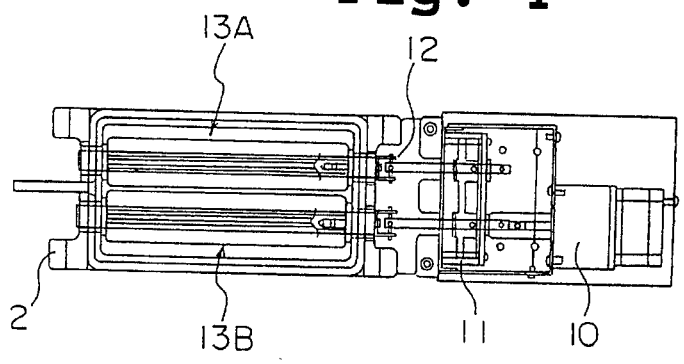
FIG. 4 is a plan view for showing the blade rollers and their drive mechanism as shown in FIG. 3.

FIG. 4 is a schematic drawing of the blade rollers 13A, 13B and their drive mechanism.

The blade 132 is made of a soft material, such as soft rubber or plastic, so that the material C is not damaged during rotation. The blades 132 of the blade roller 13A and the blades 132 of the blade roller 13B rotate in opposite directions, and all the blades rotate outwardly, i.e. toward the surfaces of the walls of the material stocker 3, as shown by arrows (a) and (b) in FIG. 3. This prevents the material C from being sandwiched and crushed between the blade rollers 13A and 13B, and also enables the material C to be extruded outside of the blade rollers 13A, 13B and to uniformly fall along the surfaces of the walls of the material stocker 3.

FIGS. 1 and 2 show that material detection sensors 14A, 14B comprising photoelectric sensors are disposed to be longitudinally spaced apart from each other on both sides of the base 2 between the screw 6 and the blade rollers 13A, 13B.

Each of the material detection sensors 14A, 14B comprises a light-emitting side and a light-receiving side located opposite to one another, and the sensors detect the presence or absence, and an amount of the material C at an upper front portion of the screw and an upper rear portion of the screw. According to the detection results, a well known control circuit is used to control the motor 10 in order to control the rotational speed of the blade rollers 13A, 13B, thereby controlling the amount of the material C falling onto the screw 6.

The rotational speed of the screw 6 may be controlled according to the detection results of the material detection sensors 14A, 14B.

A chuter member 15A diagonally mounted to have an opening at a bottom thereof, as shown in FIG. 2, is disposed at the discharge port in front of the screw 6, and the opening communicates with chuter members 15B, 15C. These chuter members 15A, 15B, 15C form a chuter 15.

A piston 16 is mounted at the end of the main body 1, and driven to open or close the opening of the chuter member 15A, as is well known, to transfer the material C and feed a specified amount of the material onto dishes (not shown) below the chuter 15.

As described above, in this embodiment, the material C in the material stocker 3 gradually falls by a pair of the blade rollers 13A, 13B made of soft rubber, for example, and is axially guided by the material guide plates 9A, 9B to the area from the center to the rear end of the screw 6, which is then transferred toward the chuter 15 by the rotation of the screw 6.

In addition, the material detection sensors 14A, 14B can constantly detect the presence or absence and the amount of the material C on the screw 6 to control the rotational speed of the blade rollers 13A, 13B. The screw 6 may be controlled, as required.

That is, in this embodiment, the material detection sensors 14A, 14B check whether the material C on the screw 6 is being transferred smoothly, and the rotational speed of the blade rollers 13A, 13B located above the material detection sensors is controlled to prevent the amount of the material C present on the screw 6 from becoming too small or too much, thereby enabling a specified amount of the material C to be supplied from the chuter 15. This also prevents the inside of the material stocker 3 or the space between the blade rollers 13A, 13B and the screw 6 from being clogged with the material C, and also presents the material from being cut or crushed or otherwise damaged.

Next, a different embodiment of the invention is described.

Figure 5:
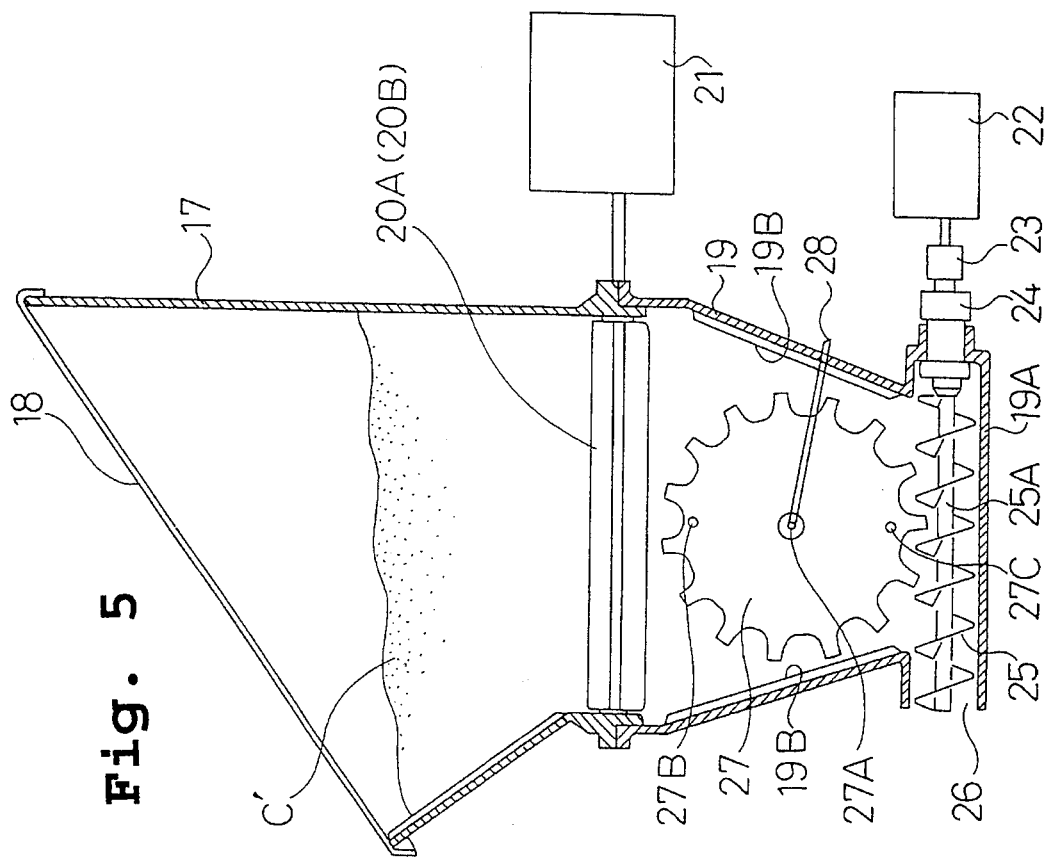
FIG. 5 is a side view showing a second embodiment of the invention.
Figure 6:
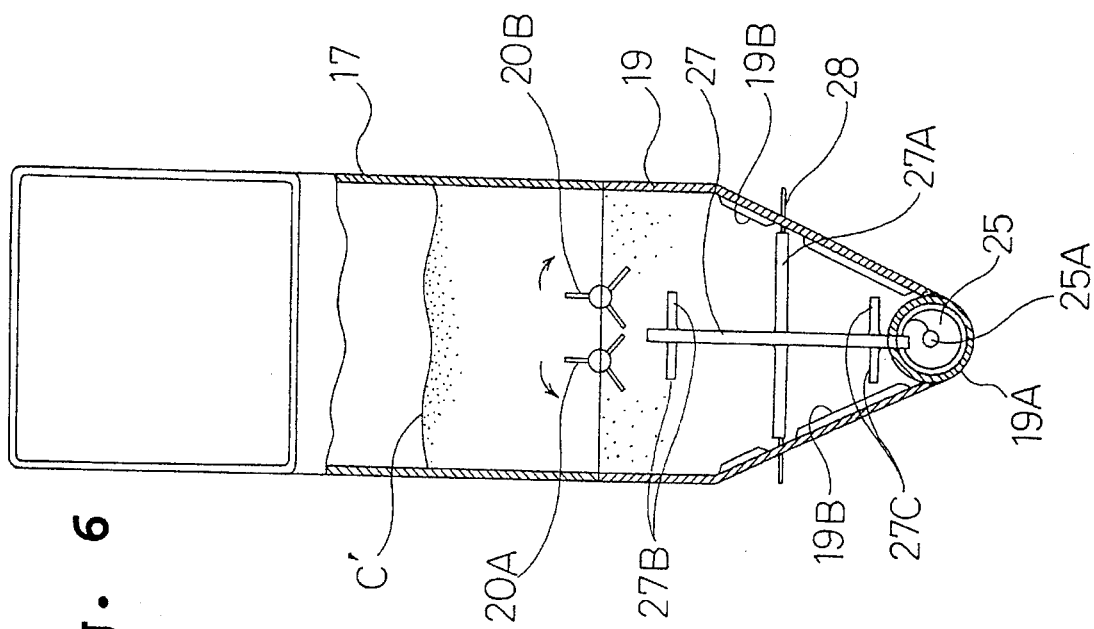
FIG. 6 is a front view of the embodiment of FIG. 5.

FIG. 5 is a side view showing the embodiment, and FIG. 6 is a front view. In these figures, numeral 17 is a material stocker, 18 is a cover, and a screw case 19 is provided under the material stocker 17.

A pair of blade rollers 20A, 20B rotating in opposite directions by a roller drive motor 21 is disposed in the space between the material stocker 17 and the screw case 19. C' is a sliced cooking material containing water, such as lettuce, for example.

Figure 7:
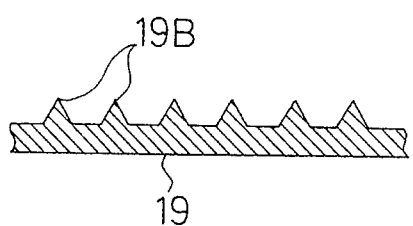
FIG. 7 is a cross sectional view of protruding portions as shown in FIGS. 5 and 6.

As is apparent from the figures, the screw case 19 is formed so that it is laterally symmetrical when viewed from a lateral side or a front, and has a plurality of protruding portions 19B with a triangular cross section disposed side by side on the inner circumferential surface. FIG. 7 shows a cross section of the protruding portions 19B.

Since the front and side shapes of the screw case 19 are laterally symmetrical, the load of the material C' is uniformly imposed on the inner circumferential surface of the screw case 19 to prevent partial blocking of the apparatus by the falling material. In addition, the protruding portions 19B serve to retain a gap between the material C' containing water, such as vegetables, and the inner circumferential surface of the screw case to reduce the contact area and prevent the cooking material C' from sticking to the surface.

The protruding portions 19B inhibit sticking to some degree even if they have a rectangular or semicircular cross section.

The screw case 19 has a cylindrical portion at its lower end, in which a screw 25 rotates around a shaft 25A extending parallel to the shafts of the blade rollers 20A, 20B. The screw 25 is driven by an external screw drive motor 22 via joints 23, 24.

Reference numeral 26 designates a discharge port located at the tip of the cylindrical portion 19A.

A wheel 27 with a large diameter is disposed between the blade rollers 20A, 20B and the screw 25 within the screw case 19 to be located above the screw 25. The wheel 27 is rotatably held by a clamp 28 mounted on the screw case 19. The rotation shaft 27A of the wheel 27 and the rotation shaft 25A of the screw 25 orient at right angles.

Agitating sticks 27B, 27C protrude from the respective sides of the wheel 27, and are spaced at an angle of about 180°.

The teeth of the wheel 27 engage the screw 25, and the wheel 27 rotates in synchronization with the screw 25. The agitating sticks 27B, 27C thus agitate or mix the surrounding cooking material C' to prevent it from clumping or sticking to the inner circumferential surface of the screw case 19, thereby enabling the material to drop smoothly.

Since the screw 25 is rotated by the screw drive motor for a specified number of times, the specified amount of the cooking material C' is supplied from the discharge port 26. In this embodiment, the roller drive motor 21 controls the rotation of the blade rollers 20A, 20B according to the number of rotation of the screw 25.

That is, the number of rotation of the motor 21 is controlled in such a way that an amount of the cooking material C' discharged due to the rotation of the screw 25 is fed toward the screw 25 as the screw 25 rotates. In other words, once the number of rotation of the screw 25 has reached a set value, the blade rollers 20A, 20B are rotated for a specified period of time.

In this case, the amount of the material supplied by the screw 25 can be set by using the number of rotation of the motor 22, so that the rotation of the blade rollers 20A, 20B can be easily controlled and the specified amount of the material C' can be supplied.

The rotation control means for the screw 25 and the blade rollers 20A, 20B has to detect that the motor 22 has rotated the set number of times, and then to rotate the motor 21 for a specified period of time. This can be done easily by using a well known control circuit.

Figure 8:
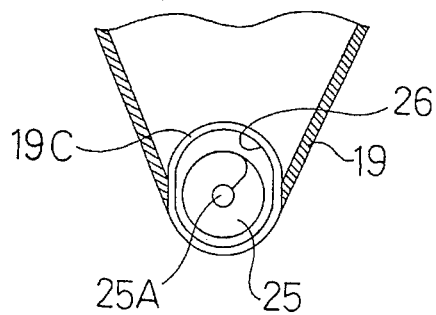
FIG. 8 is a front view of a main part of a different embodiment of the invention.

FIG. 8 shows a modified embodiment of the invention.

In this embodiment, the discharge port 26 of the cylindrical portion 19C is constructed larger, and the screw 25 is eccentrically disposed inside the discharge port. Since this formation provides a relief space for the cooking material C' between the inner circumferential surface of the cylindrical portion 19C and the screw 25 near the discharge port 26, compression associated with the rotation of the screw 25 never cause the cooking material C' to be crushed and clogged.

Figure 9:
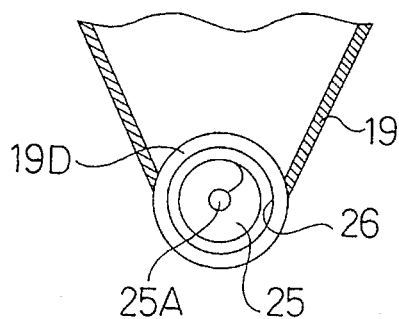
FIG. 9 is a front view of a main part of a still different embodiment of the invention.

FIG. 9 is a further modified embodiment of the invention, and is based on a concept similar to that shown in FIG. 6. That is; in this embodiment, a relief space is formed over the entire circumference of the screw 25 by forming the discharge port 26 of the cylindrical portion 19D concentrically larger than the screw 25.

Figure 10A:
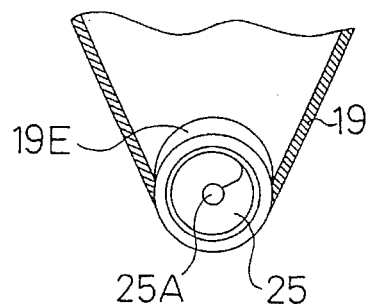
FIG. 10(A) is a front view of a main part of a still different embodiment of the invention.
Figure 10B:
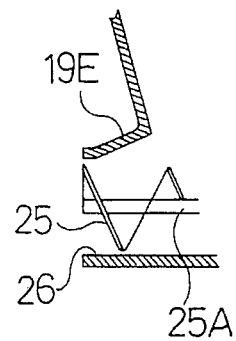
FIG. 10(B) is a side view of FIG. 10(A)

FIGS. 10(A) and 10(B) show a further modified embodiment of the invention. A cylindrical tapered portion 19E is formed near the discharge port 26 to increases its diameter inwardly, thereby forming a relief space around the screw 25 before the discharge port 26.

In the embodiments as shown in FIGS. 9 and 10, the cooking material C' is not substantially crushed and blocked near the discharge port 26. The cooking material C' can be discharged smoothly.

Figure 11:
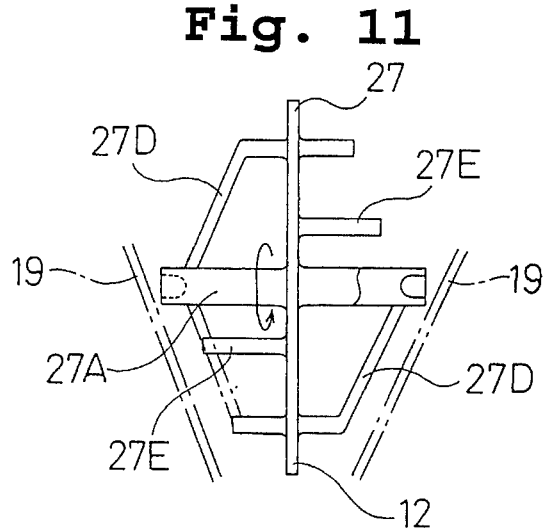
FIG. 11 is a front view of a main part of a still different embodiment of the invention.
Figure 12A:
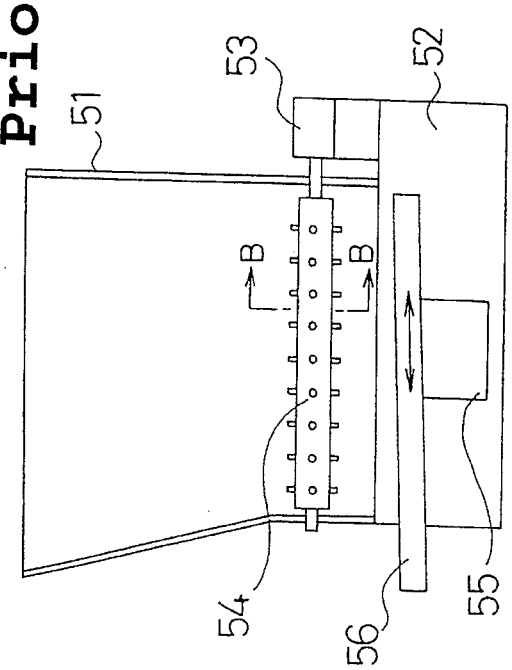
FIG. 12(A) is a side view of a conventional machine.
Figure 12B:
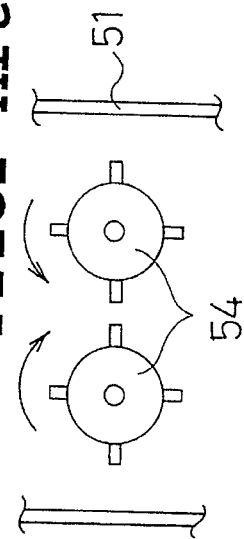
FIG. 12(B) is a cross sectional view taken along line 12(B)–12(B) of FIG. 12(A)
Figure 13:
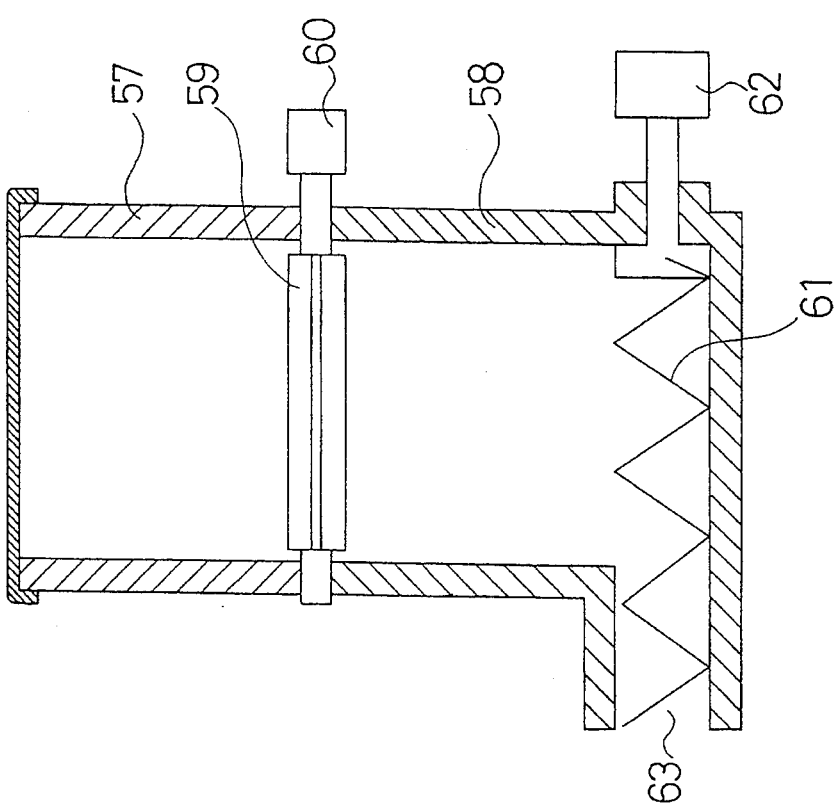
FIG. 13 is a side view showing another conventional machine.

FIG. 11 shows a still further embodiment of the invention. In this figure, agitating sticks 27D, each of which is diagonally formed to be able to agitate the cooking material C' along the inner inclined surface of the screw case 19 while the wheel 27 is rotating, are attached to both sides of the wheel 27, while agitating sticks 27E extending parallel to the rotation shaft 27A are attached to both sides of the wheel 27 close to the rotation shaft 27A.

The agitating sticks 27D appropriately agitate or mix the cooking material C', which is likely to stick to the inner inclined surface of the screw case 19, in order to enable the cooking material to fall smoothly, while the agitating sticks 27E agitate or mix the cooking material C' around the rotation shaft 27A to fall swiftly.

The invention in the second aspect can reduce costs and simplify the structure because it is not necessary to install the material detection sensors 14A, 14B required in the invention according to the first aspect.

This invention is particularly suitable for supplying a specified amount of a cooking material, which is easily cut or crushed or contain water, such as powdered cheese, sliced vegetables, minced meat, and boiled eggs.

As described above, the invention reduces the possibility of clogging the apparatus with the cooking material or damaging the cooking material, for example, cutting or crushing the cooking material while falling or being transferred. Therefore, it is possible to substantially supply a specified amount of the cooking material.

The invention is also effective in preventing the sticking of material to the inner surface of the screw case or to each other, as well as the blockage of the material or the crushing thereof near the discharge port.

What is claimed is:

1. A specified-quantity supply apparatus for transferring a specified amount of a cooking material, comprising:

a material stocker for retaining a cooking material therein;

a pair of blade rollers disposed in said material stocker to be parallel to each other, said blade rollers rotating in opposite directions in order to allow the material to fall;

a screw disposed below the blade rollers and rotating around a shaft extending parallel to shafts of the blade rollers to transfer the cooking material falling from the blade rollers toward a discharge port;

a material detection sensor disposed above the screw, said sensor detecting the cooking material on the screw; and means for controlling a rotational speed of the blade rollers based on a detection result of the material detection sensor so that a required amount of the cooking material is constantly supplied on the screw.

2. A specified-quantity supply apparatus according to claim 1, wherein the pair of the blade rollers rotate outwardly to drop the cooking material along wall surfaces of the material stocker.

3. A specified-quantity supply apparatus according to claim 2, wherein the pair of the blade rollers has blades formed of a soft material.

4. A specified-quantity supply apparatus according to claim 1, further comprising a material guide plate situated between the screw and the blade rollers for guiding the cooking material falling from the blade rollers from a center area to a rear end of the screw opposite to the discharge port.

5. A specified-quantity supply apparatus for transferring a specified amount of a cooking material, comprising:

a material stocker for retaining a cooking material therein;

a pair of blade rollers disposed in said material stocker to be parallel to each other, said blade rollers rotating in opposite directions in order to allow the material to fall;

a screw disposed below the blade rollers and rotating around a shaft extending parallel to shafts of the blade rollers to transfer the cooking material falling from the blade rollers toward a discharge port; and control means for rotating said blade rollers for a specified period of time after number of rotation of the screw reaches a set value so that a required amount of the cooking material is constantly supplied on the screw.

6. A specified-quantity supply apparatus according claim 5, further comprising a screw case for retaining the screw therein, said screw case having protruding portions formed on inner surfaces thereof, a front surface and side surfaces, said screw being accommodated in the screw case such that the screw is laterally symmetrical to prevent the cooking material from sticking thereto.

7. A specified-quantity supply apparatus according claim 5, further comprising a cylindrical portion surrounding the screw and having said discharge port, said screw being disposed eccentrically in the cylindrical portion at the discharge port to thereby form a space above the screw.

8. A specified-quantity supply apparatus according claim 5, further comprising a cylindrical portion surrounding the screw, said cylindrical portion having said discharge port and a diameter larger than the screw at the discharge port, said screw being disposed concentrically in the cylindrical portion to thereby form a space above the screw.

9. A specified-quantity supply apparatus according claim 5, further comprising a cylindrical portion having said discharge portion and surrounding the screw at the discharge port, said cylindrical portion having a tapered side near the discharge port so that a space between the cylindrical portion and the screw becomes larger toward inwardly of the screw.

10. A specified-quantity supply apparatus according to claim 5, further comprising a wheel rotating in synchronization with the screw, said wheel being disposed between the blade rollers and the screw and having agitating members mounted thereon to agitate the cooking material around said wheel.

11. A specified-quantity supply apparatus according to claim 10, wherein the agitating members are sticks rotating along inner surfaces of a screw case accommodating the screw.

\* \* \* \* \*

UNITED STATES PATENT AND TRADEMARK OFFICE
CERTIFICATE OF CORRECTION

PATENT NO.   : 5,564,329
DATED        : October 15, 1996
INVENTOR(S)  : Kazunari Tomimatsu It is certified that error appears in the above-indentified patent and that said Letters Patent is hereby corrected as shown below:

In column 6, line 21, change "That is;" to
             -- That is,--

In colum 8, lines 5, 12, 17 and 23, after "according"
             add --to--, respectively.

Signed and Sealed this

Twenty-fourth Day of December, 1996

Attest:

BRUCE LEHMAN

*Attesting Officer*   *Commissioner of Patents and Trademarks*